United States Patent [19]

Richmond et al.

[11] Patent Number: 4,682,174

[45] Date of Patent: Jul. 21, 1987

[54] MOVING TARGET INDICATOR USING A SURFACE ACOUSTIC WAVE DEVICE

[75] Inventors: Carl T. Richmond, Scottsdale; Joseph O. Lester, Mesa, both of Ariz.

[73] Assignee: Motorola, Inc., Schaumburg, Ill.

[21] Appl. No.: 785,125

[22] Filed: Oct. 7, 1985

[51] Int. Cl.[4] ............................................. G01S 13/52
[52] U.S. Cl. ..................................................... 342/160
[58] Field of Search ........................ 333/150, 154, 193; 343/7.7; 342/160–164, 192

[56] References Cited

U.S. PATENT DOCUMENTS

| | | | |
|---|---|---|---|
| 2,646,561 | 7/1953 | Emslie | 343/7.7 |
| 3,636,562 | 1/1972 | Wehner | 342/192 |
| 3,936,751 | 2/1976 | Holmes et al. | 333/152 X |
| 3,987,367 | 10/1976 | Hartemann | 329/118 |
| 4,035,800 | 7/1977 | Lewis et al. | 343/7.7 |
| 4,054,841 | 10/1977 | Henaff et al. | 329/118 |
| 4,388,595 | 6/1983 | Brooks | 329/118 |

Primary Examiner—T. H. Tubbesing
Assistant Examiner—Bernarr Earl Gregory
Attorney, Agent, or Firm—Lowell W. Gresham

[57] ABSTRACT

A surface acoustic wave (SAW) device in a pseudo-coherent moving target indicator uses a common input transducer to delay both reference and signal inputs to a mixer by varying amounts. The mixer produces a Doppler signal which is processed within a single range cell. The SAW device may contain additional delay paths which drive other range cells. Power splitting and amplification sections of the moving target indicator are minimized through use of the SAW device.

12 Claims, 3 Drawing Figures 4,682,174

MOVING TARGET INDICATOR USING A SURFACE ACOUSTIC WAVE DEVICE

BACKGROUND OF THE INVENTION

This invention relates generally to pulsed radar systems. Specifically, the present invention relates to radar systems which process a received radar signal to indicate the presence of a moving target. More specifically, the present invention relates to radar systems which process received radar signals using pseudo-coherent techniques.

A pseudo-coherent radar system represents a nonoherent system because a non-coherent local oscillator down-converts a received radio frequency (RF) signal to an intermediate frequency (IF) signal. However, a pseudo-coherent radar system splits the intermediate frequency signal into two sub-signals. These two sub-signals are coherent relative to each other. One of the sub-signals is delayed relative to the other sub-signal, and the resulting sub-signals mix together to produce a Doppler signal.

Previous pseudo-coherent, moving target indicators occupy excessively large amounts of space, consume excessive power, and require individual calibration in order to operate properly. Hence, such systems are costly to manufacture and to operate.

The problems suffered by previous moving target indicators relate to the delay technique used to delay one sub-signal relative to the other. Lumped element delay lines or predetermined lengths of coaxial transmission lines or predetermined lengths of coaxial transmission lines typically achieve these delays. However, the coaxial transmission lines are bulky and not suitable for applications which require the use of minimal space. Further, the lumped element delay lines require special tuning for each delay line to compensate for piece part tolerances.

Surface acoustic wave (SAW) devices provide delays using only a relatively small space. However, conventional SAW devices tend not to be employed to solve the particular problems faced by psuedo-coherent moving target indicators.

The problems suffered by conventional pseudo-coherent, moving target indicators additionally relate to power splitting devices and amplifiers which process the received radar signal. Regardless of the particular delay technique used, prior moving target indicator systems use an excessive number of power splitting devices and gain stages. Thus, the cost and power consumption of the radar device increases.

SUMMARY OF THE INVENTION

Accordingly, it is an object of the present invention to provide an improved moving target indicator through the use of a small delay line which need not be adjusted.

Another object of the present invention concerns providing an improved moving target indicator through the removal of unnecessary power splitting devices or amplifiers.

Yet another object of the present invention concerns providing an improved moving target indicator by adapting a surface acoustic wave delay line as a delay element.

The above and other objects and advantages of the present invention are carried out in one form by first and second amplifiers, a surface acoustic wave (SAW) delay line, and a mixer. The first amplifier receives an intermediate frequency signal and drives an input transducer of the SAW delay line. Two output transducers are located within the SAW delay line so that a distance between the input transducer and one of the output transducers minus a distance between the input transducer and the other output transducer equals a predetermined distance. The second amplifier receives a signal output from one of the SAW delay line output transducers and drives a reference input of the mixer. The other SAW delay line output transducer drives a signal input of the mixer.

BRIEF DESCRIPTION OF THE DRAWINGS

A more complete understanding of the present invention may be derived by reference to the detailed description and claims when considered in connection with the accompanying drawings in which like reference numbers designate similar parts, and wherein:

DETAILED DESCRIPTION OF THE PREFERRED EMBODIMENTS

Figure 1:
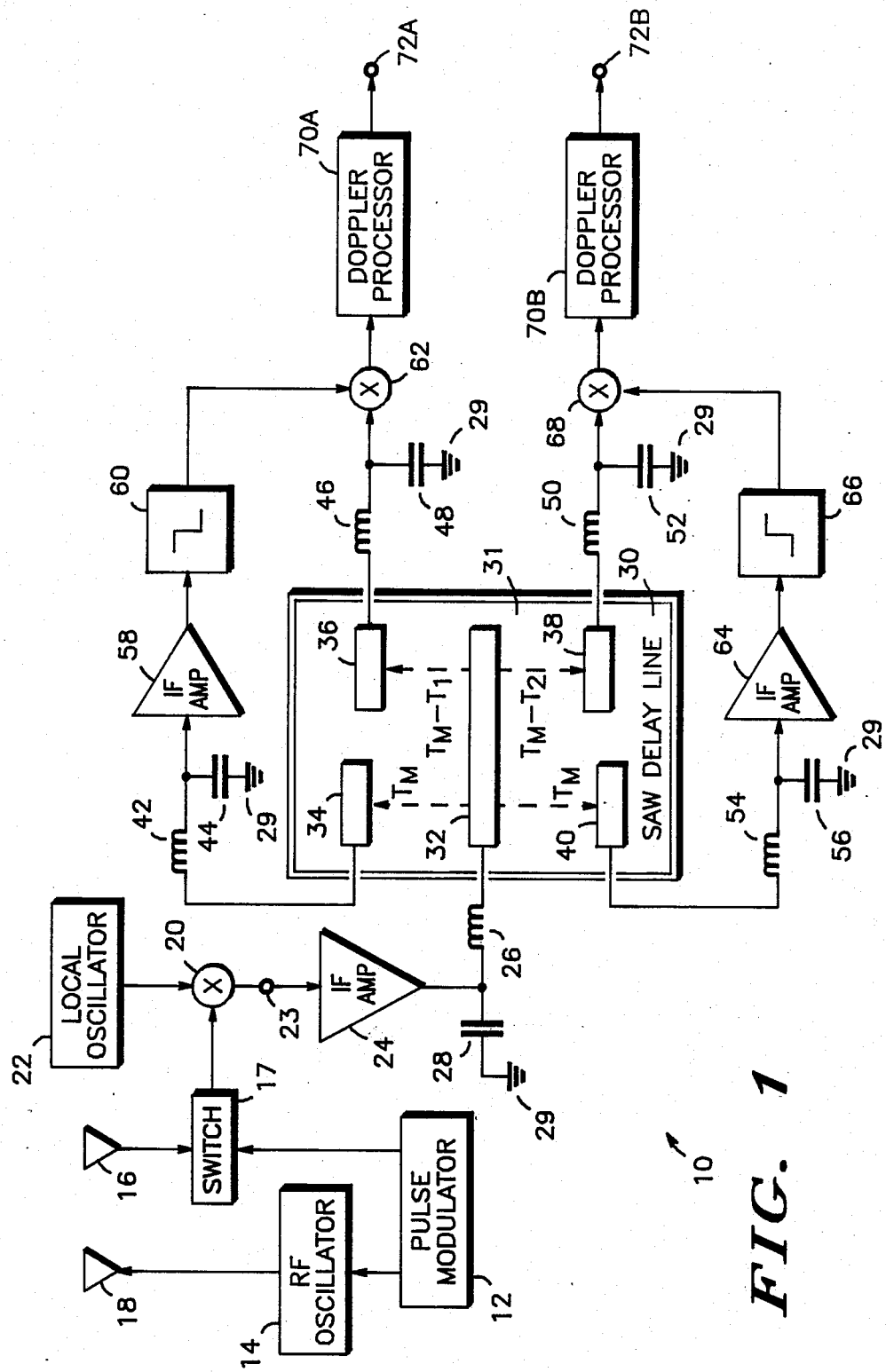
FIG. 1 shows a block diagram of a first embodiment of the present invention.

In FIG. 1, which shows a block diagram of a first embodiment of a moving target indicator (MTI) 10 built according to the teaching of the present invention, a pulse modulator 12 has a first output which connects to a control input of a radio frequency (RF) oscillator 14. An output of RF oscillator 14 connects to a transmission antenna 18. A receive antenna 16 connects to a signal input of a receiver switch 17, and a second output of pulse modulator 12 connects to a control input of switch 17. A signal output of switch 17 connects to a signal input of a mixer 20. A local oscillator 22 has an output which connects to a reference input of mixer 20, and mixer 20 has an output which connects to a terminal 23 and a signal input of intermediate frequency (IF) amplifier 24.

IF amplifier 24 has an output which connects to an input of an impedance matching network which consists of an inductor 26 shunted by a capacitor 28. Capacitor 28 connects between an input of the impedance matching network and a terminal 29 adapted to receive ground, and inductor 26 connects between the input and an output of the network. An output of this impedance matching network connects to a surface acoustic wave (SAW) delay line 30 at an input transducer 32 of SAW delay line 30. In this embodiment of MTI 10, input transducer 32 is centrally located within SAW delay line 30 on a pizeoelectric substrate 31. Output transducers 34 and 36 reside on substrate 31 of SAW delay line 30 toward a first end thereof, and output transducers 38 and 40 reside on substrate 31 near an end which opposes the first end. In other words, input transducer 32 resides between output transducers 34 and 36, at one end of substrate 31, and output transducers 38 and 40, at the opposing end of substrate 31.

Output transducers 34, 36, 38, and 40 reside predetermined distances from input transducer 32. These predetermined distances cause signals to propagate from input transducer 32 along substrate 31 and arrive at output transducers 34, 36, 38, and 40 only after predetermined time delays.

Output transducer 34 drives an input of an IF amplifier 58 through an impedance matching network which consists of a series connected inductor 42 shunted by a capacitor 44 at an output of the network. Likewise, output transducer 40 drives an input of an IF amplifier 64 through an impedance matching network which consists of a series connected inductor 54 shunted by a capacitor 56 at an output of the network. An output of IF amplifier 58 connects to an input of a limiter 60, and an output of limiter 60 connects to a reference input of a mixer 62. An output of IF amplifier 64 connects to an input of a limiter 66, and an output of limiter 66 connects to a reference input of a mixer 68.

Output transducer 36 couples to a signal input of mixer 62 through an impedance matching network consisting of a series connected inductor 46 shunted by a capacitor 48 at an output of the network. Similarly, output transducer 38 couples to a signal input of mixer 68 through an impedance matching network consisting of a series connected inductor 50 shunted by capacitor 52 at an output of the network.

An output of mixer 62 connects to an input of a Doppler processor 70a, and an output of Doppler processor 70a connects to a terminal 72a. Likewise, an output of mixer 68 connects to an input of a Doppler processor 70b, and an output of Doppler processor 70b connects to a terminal 72b. Each of Doppler processors 70 operates on data connected with a single range cell. Thus, two range cells are processed by the FIG. 1 embodiment of the present invention.

Figure 2:
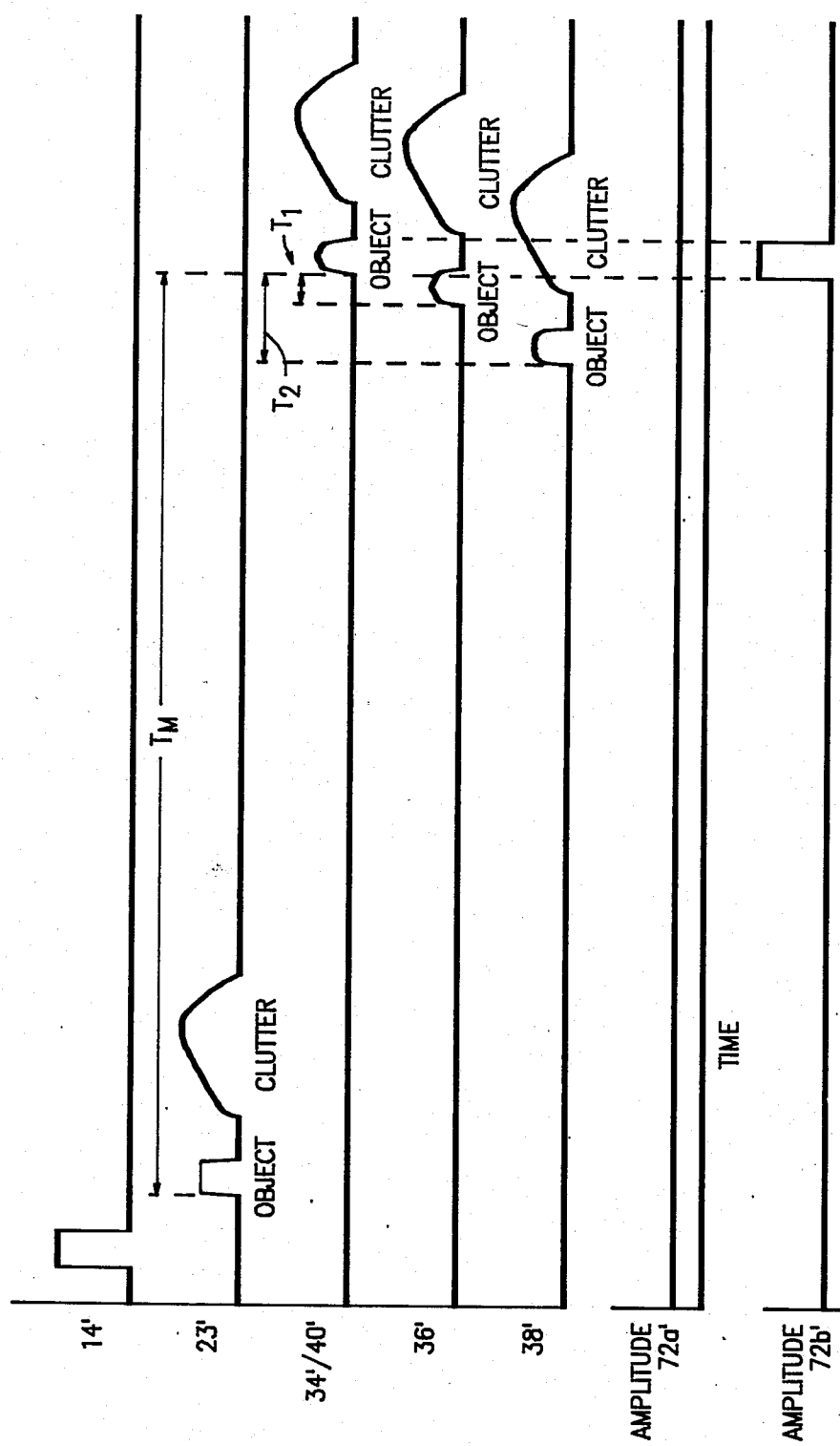
FIG. 2 shows a timing diagram of signals processed by the present invention for an example situation.

FIG. 2 shows a timing diagram of various signals which characterize the operation of MTI 10 in a particular example situation. Those skilled in the radar arts will recognize that this example is presented only as an aid in teaching the present invention. Parameters of the actual signals processed by MTI 10 will depend upon the environment in which MTI 10 operates and may not appear exactly as shown in FIG. 2.

Referring to both FIGS. 1 and 2, pulse modulator 12 causes RF oscillator 14 to produce a pulse of RF energy, as shown in trace 14' of FIG. 2. This pulse of RF energy radiates from antenna 18.

In the example depicted in FIG. 2, the radiated pulse first encounters an object (not shown) at an arbitrary distance away from antenna 18. The object reflects a portion of this RF pulse back to antenna 16. Next, the transmitted pulse encounters clutter, such as ground or water, which reflects another portion of the radiated RF pulse. The reflected portions of the radiated RF pulse return to antenna 16 and enter mixer 20. Mixer 20 down-converts the received portion of the RF signal into an IF signal which is presented at terminal 23, as shown in trace 23' of FIG. 2. In trace 23', the portion of the signal labeled "object" corresponds to the portion of RF energy reflected from the object, and the portion of signal 23' labeled "clutter" corresponds to the portion of the RF pulse reflected from the clutter.

The object portion of signal 23' may exhibit a frequency which differs from the frequency of the clutter portion of signal 23' by a Doppler frequency. This Doppler difference frequency exists when the object is moving relative to the clutter. Additionally, the object portion of signal 23' may exhibit a lower amplitude and a narrower pulsewidth than the clutter portion of signal 23'. These signal characteristics between the object and clutter typically occur because the object is relatively small compared to the clutter. Thus, the object reflects a smaller portion of the RF energy than is reflected by the clutter. Relative distances between the object, the clutter, and antenna 16 and 18 may cause these characteristics to change from that described above and shown in trace 23'. Nevertheless, in the present invention it is anticipated that the object portion of signal 23' will exhibit a pulsewidth substantially equal to the pulsewidth of signal 14', and that the clutter portion of signal 23' will exhibit a pulsewidth greater than the pulsewidth of signal 14' in an environment in which the present invention operates.

Signal 23' represents a non-coherent signal relative to RF pulse 14' because the signal generated by local oscillator 22 bears no phase relation to RF pulse 14'. Furthermore, in the present embodiment RF pulse 14' may exhibit a relatively narrow pulsewidth, such as from a few tens of nanoseconds to 100 nanoseconds. Additionally, an IF frequency exhibited by signal 23' may be several hundred MHz.

SAW delay line 30 is designed to operate at the IF frequency. The IF frequency may not experience a significant frequency change because the SAW device operates only within a limited bandwidth. Further, SAW delay line 30 may present an impedance which matches driving and receiving transmission lines, such as 50 ohm lines which the preferred embodiment uses. Thus, the impedance matching networks described above operate to couple a maximum amount of power into and from SAW delay line 30.

The IF signal enters SAW delay line 30 where it is split into four separate IF sub-signals by operation of the SAW device. The IF sub-signal provided at output transducer 34 is delayed by time delay $T_m$ relative to IF signal 23' input at input transducer 32. Likewise, the IF sub-signal produced at output transducer 40 is delayed from the IF signal at input transducer 32 by time delay $T_m$, as shown in trace 34'/40' of FIG. 2. Thus, output transducers 34 and 40 reside equivalent distances away from input transducer 32. Output transducer 36 produces an IF sub-signal which is delayed by an amount of time equivalent to $T_m - T_1$, as shown in trace 36' of FIG. 2. Similarly, output transducer 38 generates an IF sub-signal which is delayed by an amount of time equal to $T_m - T_2$, as shown in trace 38' of FIG. 2.

Mixers 62 and 68, which receive the delayed subsignals, down-convert signals 36' and 38' using signals 34' and 40' as a reference. The resulting outputs from mixers 62 and 68 represent Doppler signals. The frequency of each Doppler signal represents the difference in frequency from the object portion of the IF signal relative to the clutter portion of the IF signal. However, a Doppler frequency results only when the object portion of an IF sub-signal and the clutter portion of an IF sub-signal coincide in time at the signal and reference inputs of mixers 62 and 68. Doppler processors 70a and 70b each monitor Doppler signals and output a signal exhibiting a digital logic level in response to the presence of a detected Doppler frequency.

For the example depicted in FIG. 2, the object portion of signal 34' does not occur while the clutter portion of signal 36' occurs. Thus, no Doppler frequency signal is produced by mixer 62, and Doppler processor 70a generates a low logic level signal, as shown in trace 72a', throughout the period over which the object and clutter portions of signals 36' and 34' occur.

In the FIG. 2 example, the object portion of signal 36' occurs during two portions of signal 34'. A first portion exists where neither the object nor the clutter portion of signal 34' resides. The second portion exists during the object portion of signal 34'. Thus, mixer 62 down-converts signal 36' using a reference of no signal during the first portion and a reference of the object during the second portion. Mixer 62 produces a low level output or a near DC level output as a result of using these two references. Likewise, a first part of the clutter portion of signal 36' exists when neither the object nor clutter portion of signal 34' occurs. Additionally, a second part of the clutter portion of signal 36' exists when the only clutter portion of signal 34' occurs. Again, either a low level output or a near DC level output is produced by mixer 62 as a result.

Signal 38' shifts an amount of time $T_2$ from signal 40'. Time delay $T_2$ differs from delay $T_1$. In this example the clutter portion of signal 38' occurs while the object portion of signal 40' occurs. Since the object portion and the clutter portion exhibit frequencies which differ by a Doppler shift, the resulting output from mixer 68 represents a Doppler signal which exhibits a frequency greater than a DC level. This Doppler signal is detected by Doppler processor 70b, which provides the resulting digital pulse shown in trace 72b' of FIG. 2.

As discussed above, signal 36' differs from signal 34' by a time delay equivalent to $T_1$, and signal 38' differs from signal 40' by a time delay equivalent to $T_2$. In the present embodiment, time period $T_1$ substantially equals 0.75 times the pulsewidth of radiated RF pulse 14', and time period $T_2$ substantially equals 2.25 times the pulsewidth of radiated RF pulse 14'. These numbers are arrived at through a statistical analysis of the characteristics of typical clutter returns. Such returns tend to exhibit a greater pulsewidth than object returns, as shown in FIG. 2. Accordingly, $T_1$ and $T_2$ represent time delays of less than 225 nanoseconds when pulsewidths of less than 100 nanoseconds are used for the transmitted RF pulse.

SAW delay lines fail to operate correctly at time delays of less than 200 nanoseconds because this delay requires the location input and output transducers relatively close to each other. When input and output transducers are located near each other, signals tend to couple directly to the output transducers from the input transducer rather than coupling acoustically through substrate 31. To achieve time delays $T_1$ and $T_2$, SAW delay line 30 delays both signal and reference input signals to mixers 62 and 68 by an arbitrary amount which permits proper operation of SAW delay line 30. In the present embodiment each delay produced in SAW delay line 30 is greater than 500 nanoseconds to insure proper operation of SAW delay line 30.

Additionally, SAW delay line 30 utilizes a common substrate, substrate 31, to achieve each of the delays described above. An environmental factor which might affect any one of the delays produced within SAW device 30 tends to affect all of the delays proportionately. Accordingly, the delay differences which represent $T_1$ and $T_2$ remain unaffected by the magnitude of $T_m$.

Referring to FIG. 1, IF amplifier 24 amplifies the IF signal presented at its input by an amount which compensates for a signal loss which occurs in transmitting the IF signal through SAW delay line 30. However, the amplification is low enough to permit linear operation of mixers 62 and 68 through the signal inputs thereof. In the present embodiment SAW delay line 30 is expected to cause an approximate 25 DB loss.

IF amplifiers 58 and 64 amplify signals produced at output transducers 34 and 40 so that amplifiers 58 and 64 in cooperation with limiters 60 and 66, respectively, maintain a constant level signal at the reference inputs of mixers 62 and 68, respectively, over the range of anticipated signal input levels. However, those skilled in the art will recognize that limiters 60 and 66 may be replaced with automatic gain control circuits coupled to amplifiers 58 and 64, respectively.

Figure 3:
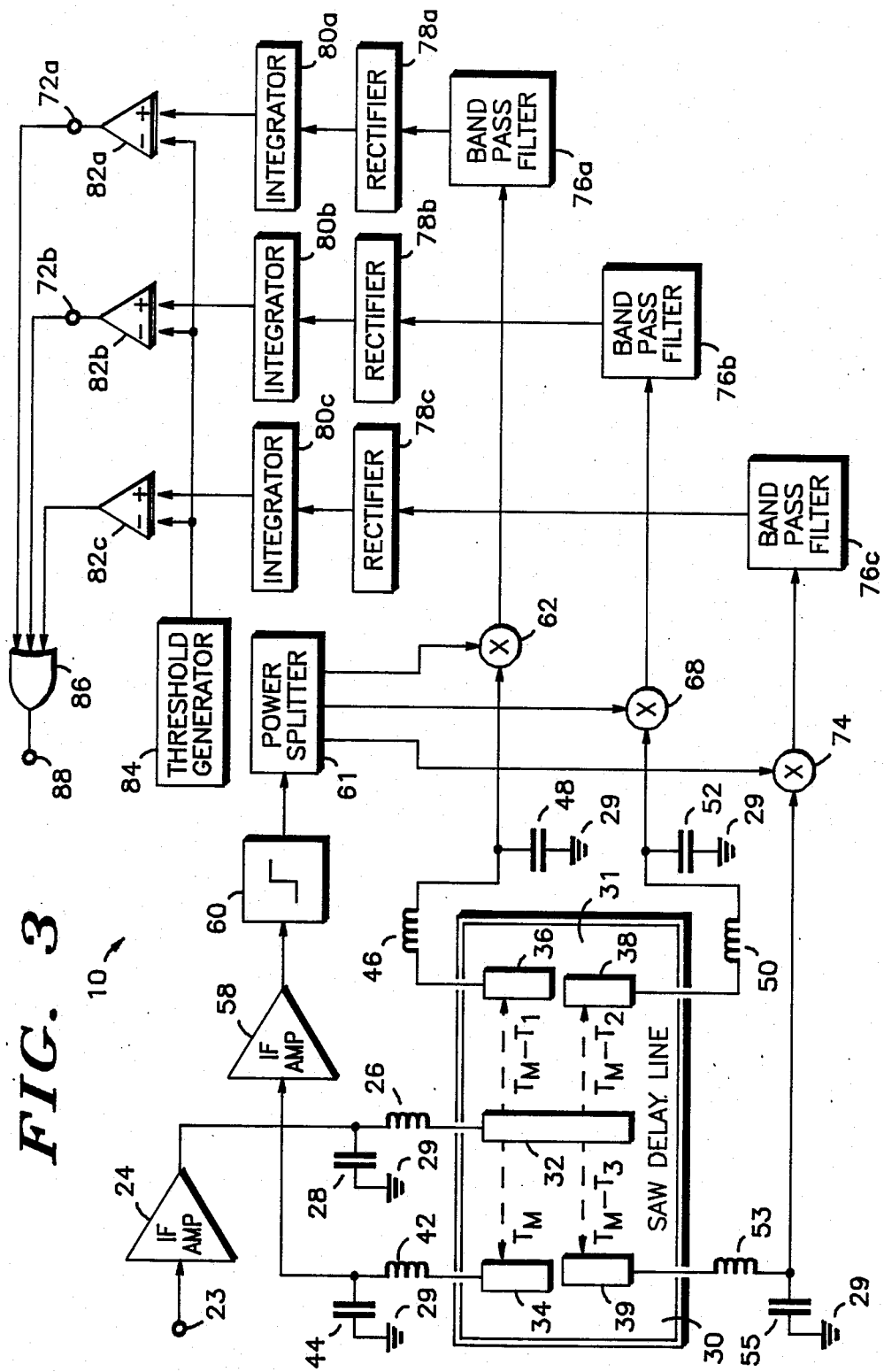
FIG. 3 shows a second embodiment of the present invention.

A second embodiment of MTI 10 is shown in FIG. 3. Like numbers between FIG. 1 and FIG. 3 represent like parts. Thus, an IF signal is presented at terminal 23 in FIG. 3 similar to the IF signal appearing at terminal 23 in FIG. 1, and depicted as signal 23' of FIG. 2. In FIG. 3, terminal 23 connects to a signal input of IF amplifier 24. The output of IF amplifier 24 couples to input transducer 32 of SAW delay line 30 through the impedance matching network which consists of series connected inductor 26 shunted by capacitor 28. Output transducer 34 of SAW delay line 30 couples to the signal input of IF amplifier 58 through the impedance matching network which consists of series connected inductor 42 shunted by capacitor 44. The output of IF amplifier 58 connects to the input of limiter 60, and the output of limiter 60 connects to an input of a power splitter 61.

Power splitter 61 has three outputs. A first output of power splitter 61 connects to the reference input of mixer 62, a second output of power splitter 61 connects to the reference input of mixer 68, and a third output of power splitter 61 connects to a reference input of a mixer 74. Output transducers 36, 38, and 39 of SAW delay line 30 couple to signal inputs of mixers 62, 68, and 74, respectively, through impedance matching networks consisting of series connected inductor 46 shunted by capacitor 48, series connected inductor 50 shunted by capacitor 52, and series connected inductor 53 shunted by capacitor 55, respectively.

Outputs of mixers 62, 68, and 74, connect to inputs of bandpass filters 76a, 76b, and 76c, respectively. Outputs of bandpass filters 76a, 76b, and 76c, connect to inputs of rectifiers 78a, 78b, and 78c, respectively. Outputs of rectifiers 78a, 78b, and 78c, connect to inputs of integrators 80a, 80b, and 80c, respectively. Outputs of integrators 80a, 80b, and 80c, connect to non-inverting inputs of comparators 82a, 82b, and 82c, respectively. A threshold generator 84 provides a reference level at an output thereof. The output of threshold generator 84 connects to each inverting input of comparators 82a, 82b, and 82c. Outputs of comparators 82a and 82b connect to terminals 72a and 72b, and to first and second inputs of a three input OR device 86. An output of comparator 82c connects to a third input of OR device 86. Finally, an output of OR device 86 connects to a terminal 88.

Three range cells are provided in MTI 10 of FIG. 3, whereas only two range cells are provided in MTI 10 of FIG. 1. Bandpass filter 76, rectifier 78, integrator 80, and comparator 82 for each range cell collectively represent a single doppler processor 70 (see FIG. 1). Additionally, the FIG. 3 MTI 10 utilizes only one IF amplifier and limiter to drive reference inputs of mixers 62, 68, and 74, whereas the FIG. 1 MTI 10 used two IF amplifiers and limiters to drive the reference inputs of mixers 62 and 68. As a consequence of using only one IF amplifier 58 and limiter 60 in FIG. 3, power splitter 61 splits the one signal output from limiter 60 into three reference signals for mixers 62, 68, and 74.

In the FIG. 3 MTI 10, the IF signal processed through IF amplifier 24 and input to SAW delay line 30 at input transducer 32 splits into four IF sub-signals produced at the output transducers of SAW delay line 30. Output transducer 34 provides an IF sub-signal which serves as a reference input to mixers 62, 68, and 74. This reference signal is delayed by an amount of time equivalent to $T_m$. The operation of IF amplifier 58 and limiter 60 maintains a constant level signal at the reference inputs of mixers 62, 68, and 74.

Output transducers 36, 38, and 39 produce signals which are delayed amounts of time equivalent to $T_m - T_1$, $T_m - T_2$, and $T_m - T_3$, respectively. These IF subsignals drive signal inputs of mixers 62, 68, and 74.

Output signals from mixers 62, 68, and 74 enter bandpass filters 76, which pass only frequencies within an expected Doppler frequency range, such as from 5,000 Hz to 40,000 Hz. Near DC frequency signals, and near IF frequency signals are blocked by bandpass filters 76. Output signals from bandpass filters 76 are rectified in rectifiers 78 for application to integrators 80.

Integrators 80 measure the amount of time signals within the Doppler frequency range are being produced at the outputs of mixers 62, 68, and 74. Signals appearing at the integrator output exhibit higher voltage levels when Doppler frequency signals are present for a greater amount of time. The output signals produced by integrators 80 are compared against a predetermined threshold, such as may be provided by a resistor divider network, in comparators 82. The results of the comparisons appear in output signals from comparators 82 as digital signal levels. OR device 86 combines Doppler processing results from each of the three range cells and provides an active logic level signal whenever any Doppler signal within the Doppler frequency range is detected in any of the range cells.

Separate processing of the signals in each of the range cells by a bandpass filter 76, rectifier 78, integrator 80, and comparator 82 is provided to prevent phase cancellation of Doppler signals which may result in a failure to detect a moving target. Additionally, the separate processing prevents noise, which is present in each of the range cells, from adding with noise present in the other range cells to reduce detection sensitivity for a moving target.

In summary, the present invention adapts a SAW device to a pseudo-coherent, moving target indicator. The SAW device uses only a relatively small space compared to coaxial transmission lines and requires no special tuning for each piece part produced. Power splitting devices need not be used in a moving target indicator, as demonstrated in the first embodiment shown in FIG. 1. Additionally, IF amplification stages may be minimized as demonstrated in the second embodiment shown in FIG. 3.

Accordingly, while the invention has been particularly shown and described with reference to preferred embodiments, those skilled in the art will understand that changes in form and details may occur therein without departing from the scope of the present invention. For example, a greater or lesser number of output transducers may be included in SAW delay line 30 to accommodate a greater or lesser number of range cells. The particular absolute pulsewidths and time delays described herein are subject to significant changes without affecting the scope of the present invention. Additionally, the filtering, rectifying and integrating functions accomplished by bandpass filter 76, rectifier 78, and integrator 80 in each range cell may advantageously be performed in a single circuit. These and other changes and modifications obvious to those skilled in the art fall within the scope of the present invention.

What is claimed is:

1. A pseudo-coherent, moving target indicator comprising:

a first amplifier having an input and an output, said first amplifier input being adapted to receive an intermediate frequency signal;

a surface acoustic wave delay line operative at the intermediate frequency and having an input transducer, a first output transducer, and a second output transducer, said delay line input transducer being coupled to the output of said first amplifier, and said delay line first and second output transducers being located relative to the input transducer so that a distance between the input transducer and the first output transducer minus a distance between the input transducer and the second output transducer equals a predetermined distance;

a second amplifier having an input and an output, said second amplifier input being coupled to a first one of the first and second output transducers of said delay line; and a mixer having a reference input coupled to the output of said second amplifier, having a signal input coupled to a second one of the first and second output transducers of said delay line and having an output for providing a Doppler signal.

2. A moving target indicator as claimed in claim 1 wherein said mixer has an output and the moving target indicator additionally comprises a bandpass filter coupled to said mixer output.

3. A moving target indicator as claimed in claim 1 additionally comprising a limiter having an input and an output, said limiter input being coupled to the output of said second amplifier, and said limiter output being coupled to said mixer reference input.

4. A moving target indicator as claimed in claim 1 wherein said delay line has a third output transducer, said third output transducer being located relative to the input transducer so that a distance between the input transducer and the first output transducer minus a distance between the input transducer and the third output transducer equals a second predetermined distance, the moving target indicator additionally comprising:

a power splitter having an input, a first output, and a second output, said power splitter input being coupled to the output of said second amplifier, and said power splitter first output being coupled to the reference input of said mixer; and a second mixer having a reference input coupled to the second output of said power splitter and a signal input coupled to the third output transducer of said delay line.

5. A moving target indicator as claimed in claim 4 wherein said mixer has an output and said second mixer has an output, the moving target indicator additionally comprising means, coupled to said mixer output and said second mixer output, for indicating whether energy exhibiting a Doppler frequency is present at the outputs of one of said mixer and said second mixer.

6. A moving target indicator as claimed in claim 4 additionally comprising an antenna coupled to the input of said first amplifier, said antenna being for transmitting a pulse of radio frequency energy and for receiving reflected portions of the transmitted pulse of energy, the transmitted pulse having a predetermined pulsewidth, and wherein the first and second output transducers of said delay line are located relative to said delay line input transducer so that the predetermined distance causes a delay substantially equal to 0.75 times the predetermined pulsewidth.

7. A moving target indicator as claimed in claim 6 wherein said first and third output transducers of said delay line are located relative to said delay line input transducer so that the second predetermined distance causes a delay substantially equal to 2.25 times the predetermined pulsewidth.

8. A moving target indicator as claimed in claim 1 additionally comprising:
- a first impedance matching network coupled between the input transducer of said delay line and the output of said first amplifier;
- a second impedance matching network coupled between the input of said second amplifier and the first one of the first and second output transducers of said delay line; and
- a third impedance matching network coupled between the signal input of said mixer and the second one of the first and second output transducers of said delay line.

9. A method of detecting a moving target using a pseudo-coherent, moving target indicator having a surface acoustic wave delay line therein, said method comprising the steps of:
- generating an intermediate frequency signal;
- amplifying the intermediate frequency of said generating step;
- splitting, after said amplifying step, the intermediate signal into first and second intermediate sub-signals within the delay line;
- delaying in the delay line the first intermediate frequency sub-signal a first predetermined amount of time relative to the intermediate signal;
- delaying in the delay line the second intermediate frequency sub-signal a second predetermined amount of time relative to the intermediate signal;
- providing a first one of the first and second intermediate frequency sub-signals to a reference input of a mixer so that the first one of the first and second intermediate frequency sub-signals exhibits a substantially constant level at the reference input of the mixer; and
- multiplying in the mixer a second one of the first and second intermediate frequency sub-signals with the first one of the first and second intermediate frequency subsignals to produce a Doppler signal.

10. A method as claimed in claim 9 additionally comprising the step of filtering the Doppler signal so that DC frequency and intermediate frequency signals are blocked.

11. A method as claimed in claim 9 wherein:
- said splitting step additionally splits the intermediate signal into a third intermediate sub-signal within the delay line;
- the method additionally comprises the step of delaying in the delay line the third intermediate frequency sub-signal a third predetermined amount of time relative to the intermediate signal;
- said providing step provides a first one of the first, second, and third intermediate frequency subsignals;
- the method additionally comprises the step of splitting the first one of the first, second, and third intermediate frequency sub-signals provided in said providing step into first and second substantially constant level reference signals at reference inputs of the mixer and a second mixer; and
- the method additionally comprises the step of multiplying in the second mixer a third one of the first, second, and third intermediate frequency subsignals with the first one of the first, second, and third intermediate frequency sub-signals.

12. A pseudo-coherent, moving target indicator comprising:
- a first amplififer having an input and an output, said first amplifier input being adapted to receive an intermediate frequency signal;
- a surface acoustic wave delay line operative at the intermediate frequency and having an input transducer, a first output transducer, a second output transducer, and a third output transducer, said delay line input transducer being coupled to the output of said first amplifier, and said first, second, and third output transducers being located relative to the input transducer so that a distance between the input transducer and the first output transducer minus a distance between the input transducer and the second output transducer corresponds to a first predetermined delay, and a distance between the input transducer and the first output transducer minus a distance between the input transducer and the third output transducer corresponds to a second predetermined delay;
- a second amplifier having an input and an output, said amplifier input being coupled to the first output transducer of said delay line;
- a limiter having an input and an output, said limiter input being coupled to the output of said second amplifier;
- a power splitter having an input, a first output, and a second output, said power splitter input being coupled to the output of said limiter;
- a first mixer having a reference input coupled to the first output of said power splitter, a signal input coupled to the second output transducer of said delay line, and an output for providing a first Doppler signal;
- a second mixer having a reference input coupled to the second output of said power splitter, a signal input coupled to the third output transducer of said delay line, and an output for providing a second Doppler signal;
- a first bandpass filter coupled to the output of said first mixer; and
- a second bandpass filter coupled to the output of said second mixer.

* * * * *